United States Patent
Qiu et al.

(10) Patent No.: US 11,796,263 B2
(45) Date of Patent: Oct. 24, 2023

(54) VALVE ASSEMBLY, HEAT EXCHANGE ASSEMBLY, AND OIL TEMPERATURE REGULATION SYSTEM FOR GEARBOX

(71) Applicant: Zhejiang Sanhua Automotive Components Co., Ltd., Zhejiang (CN)

(72) Inventors: Haoming Qiu, Zhejiang (CN); Xiaojun Qian, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 689 days.

(21) Appl. No.: 16/651,278

(22) PCT Filed: Sep. 18, 2018

(86) PCT No.: PCT/CN2018/106154
§ 371 (c)(1),
(2) Date: Mar. 26, 2020

(87) PCT Pub. No.: WO2019/062592
PCT Pub. Date: Apr. 4, 2019

(65) Prior Publication Data
US 2020/0271216 A1  Aug. 27, 2020

(30) Foreign Application Priority Data
Sep. 27, 2017 (CN) .......................... 201710889129.6

(51) Int. Cl.
*F28F 27/02* (2006.01)
*F16H 57/04* (2010.01)
*F28D 21/00* (2006.01)

(52) U.S. Cl.
CPC ......... *F28F 27/02* (2013.01); *F16H 57/0417* (2013.01); *F28D 2021/0089* (2013.01)

(58) Field of Classification Search
CPC ................. F28F 27/02; F16H 57/0417; F28D 2021/0089
See application file for complete search history.

(56) References Cited

U.S. PATENT DOCUMENTS 7,819,332 B2 * 10/2010 Martin ............... G05D 23/1333
  236/93 R
9,239,195 B2 * 1/2016 Kim ...................... F28D 9/0093
(Continued)

FOREIGN PATENT DOCUMENTS

CN  2052049 U   1/1990
CN  101278107 A  10/2008
(Continued)

OTHER PUBLICATIONS

International Search Report and Written Opinion for International Application No. PCT/CN2018/106154, dated Dec. 21, 2018.
(Continued)

*Primary Examiner* — Tho V Duong
(74) *Attorney, Agent, or Firm* — Wolf, Greenfield & Sacks, P.C.

(57) ABSTRACT

A valve assembly, a heat exchange assembly, and an oil temperature regulation system for a gearbox. The heat exchange assembly includes a heat exchange core body, the valve assembly, an adapter, and a mounting plate fixed to the heat exchange core body. The valve assembly is disposed at a second channel of the heat exchange core body or partially located at the second channel. The valve assembly is provided with a first valve port and a first notch. The heat exchange core body includes a through channel that is in communication with a fourth port.

10 Claims, 4 Drawing Sheets

(56) References Cited

U.S. PATENT DOCUMENTS

| | | | |
|---|---|---|---|
| 2006/0108435 A1* | 5/2006 | Kozdras | G05D 23/1333 236/93 R |
| 2007/0164123 A1 | 7/2007 | Willers et al. | |
| 2008/0202450 A1 | 8/2008 | Martin et al. | |
| 2010/0213401 A1* | 8/2010 | Martin | F16H 57/0413 251/324 |
| 2012/0273177 A1 | 11/2012 | Kim et al. | |
| 2013/0087231 A1 | 4/2013 | Tung | |
| 2013/0160972 A1* | 6/2013 | Sheppard | F28F 27/02 165/96 |
| 2013/0319634 A1* | 12/2013 | Sheppard | F28F 27/02 165/96 |
| 2015/0185738 A1* | 7/2015 | Qiu | G05D 23/022 236/101 A |
| 2015/0369115 A1 | 12/2015 | Kim et al. | |
| 2016/0215664 A1* | 7/2016 | Boyer | F01P 3/12 |
| 2016/0224037 A1 | 8/2016 | Qiu et al. | |
| 2016/0349770 A1* | 12/2016 | Sheppard | G05D 23/022 |
| 2017/0030456 A1 | 2/2017 | Zou et al. | |
| 2018/0010866 A1* | 1/2018 | Sheppard | F16K 31/002 |

FOREIGN PATENT DOCUMENTS

| | | |
|---|---|---|
| CN | 102758677 A | 10/2012 |
| CN | 103574264 A | 2/2014 |
| CN | 103851169 A | 6/2014 |
| CN | 105277013 A | 1/2016 |
| CN | 204961799 U | 1/2016 |
| CN | 105697748 A | 6/2016 |
| CN | 106402355 A | 2/2017 |
| EP | 3 124 901 A2 | 2/2017 |
| JP | S61-84487 A | 4/1986 |
| KR | 101519961 B1 * | 5/2015 |

OTHER PUBLICATIONS

Extended European Search Report for European Application No. 18861030.7, dated Jun. 23, 2021.
First Office Action for Chinese Application No. 201710889129.6, dated Mar. 23, 2020.
EP18861030.7, Jun. 23, 2021, Extended European Search Report.
CN201710889129.6, Mar. 23, 2020, First Office Action.
PCT/CN2018/106154, Dec. 21, 2018, International Search Report and Written Opinion.

* cited by examiner

VALVE ASSEMBLY, HEAT EXCHANGE ASSEMBLY, AND OIL TEMPERATURE REGULATION SYSTEM FOR GEARBOX

This application is a national stage filing under 35 U.S.C. § 371 of International Patent Application Serial No. PCT/CN2018/106154, filed Sep. 18, 2018, which claims priority to Chinese Patent Application No. 201710889129.6, titled "VALVE ASSEMBLY, HEAT EXCHANGE DEVICE, AND OIL TEMPERATURE REGULATION SYSTEM FOR GEARBOX", filed on Sep. 27, 2017 with the China National Intellectual Property Administration. The contents of these applications are incorporated herein by reference in their entirety.

FIELD

The present application relates to the field of fluid control, and in particular to a valve assembly, a heat exchange assembly and an oil temperature regulation system for a gearbox.

BACKGROUND

In a running process of a vehicle, parts of the vehicle need to be lubricated with lubricating oil in time to ensure the normal operation of the vehicle. If the lubricating performance of the lubricating oil is not good enough, the service life of the vehicle will be affected. The lubricating property of the lubricating oil is closely associated with the temperature of the lubricating oil. When the temperature of the lubricating oil is too high or too low, the lubricating property of the lubricating oil will be adversely affected.

The existing gearbox oil realizes a temperature regulating function mainly through a cooling flow path composed of a thermostatic valve and an external cooling device. In a general thermal management system, a heat exchanger is adopted to perform cooling, and the hot oil is cooled by cooling water or refrigerant, to keep the gear oil within a certain operating temperature range. In a thermostatic valve, flow paths of the lubricating oil or the coolant are controlled by a valve core to switch the fluid flow path.

However, the valve core is thermally expanded and contracted according to the temperature of the fluid sensed by a heat sensitive substance. From sensing temperature by the heat sensitive substance to the thermal expansion and contraction, then to providing a spring force, a certain response time is required. Therefore, the response time of the valve core is relatively slow, which causes the temperature of the lubricating oil to generate certain hysteresis, thereby adversely affecting the performance of the gearbox or even damaging the gearbox. Moreover, the valve core is large and needs to cooperate with the spring to realize the switching of the flow path.

SUMMARY

A heat exchange assembly is provided according to the present application, which includes a heat exchange core body and a mounting plate fixed to the heat exchange core body. The heat exchange assembly further includes a first port, a second port, a third port and a fourth port. The heat exchange core body includes an end plate, and the heat exchange core body further includes a first flow passage and a second flow passage, which are isolated from each other, wherein the first flow passage is in communication with the first port and the second port, the second flow passage is in communication with the third port and the fourth port, and the second flow passage includes a first passage and a second passage. The heat exchange assembly further includes a valve assembly and an adapter seat, wherein the adapter seat is provided with a cavity corresponding to the second passage and a fifth port in communication with the cavity, and the valve assembly is arranged in or partially arranged in the second passage.

The valve assembly includes a main valve body and a valve core arranged in the main valve body. One end of the main valve body is sealingly mounted with the adapter seat, and another end of the main valve body is sealingly mounted with the fourth port or an inner wall of the second passage. A side wall of the main valve body is provided with a first notch, a first valve port and a second valve port are arranged in the main valve body, and a first spring and a second spring are further arranged in the main valve body. The second spring is made of a memory alloy, An elastic force of the second spring, when the second spring gains elastic performance, is greater than an elastic force of the first spring at this time instant, and a direction of the force of the first spring acting on the valve core is opposite to a direction of the force of the second spring acting on the valve core.

When the first valve port is open and the second valve port is closed, the third port is in communication with the fourth port via the first passage, the second passage, the first notch and the first valve port.

When the first valve port is closed and the second valve port is open, the third port is in communication with the fifth port via the first passage, the second passage, the first notch and the second valve port.

An oil temperature regulation system for a gearbox is further provided according to the present application, which includes a gearbox, a heat exchange assembly and an oil cooler. The heat exchange assembly is the heat exchange assembly according to any one of the above aspects. The third port and the fourth port are in direct communication with an inlet and an outlet of the gearbox, or the third port and the fourth port are in communication with the inlet and the outlet of the gearbox via pipelines. An outlet of one flow passage of the oil cooler is in communication with the heat exchange assembly through the pipelines, and an inlet of the flow passage of the oil cooler is in communication with the fifth port.

When a temperature of a cooling oil is in a normal state after the cooling oil flowing out from the outlet of the gearbox performs heat exchange within the heat exchange core body, the cooling oil enters the valve assembly via the first notch, and due to the failure of the elastic properties of the second spring, the valve core allows the first valve port to be in an open state under a restoring force of the first spring, the second valve port is closed, and the cooling oil flows back to the gearbox via the fourth port and the inlet of the gearbox after passing through the first valve port.

When the temperature of the cooling oil is relatively high after the cooling oil flowing out from the outlet of the gearbox performs heat exchange within the heat exchange core body, the cooling oil enters the valve assembly via the first notch, the elastic properties of the second spring are activated at this time, the valve core closes the first valve port, the first valve port is in a closed state, the second valve port is opened, the cooling oil flows to the oil cooler via the fifth port, and the cooling oil flowing out of the oil cooler flows back to the gearbox via the inlet of the gearbox after passing through a through passage and the fifth port.

A valve assembly is further provided according to the present application, which includes a main valve body and a valve core. The valve assembly is further provided with a first spring and a second spring. The second spring is made of a memory alloy, and an elastic force of the second spring, when the second spring gains elastic performance, is greater than an elastic force of the first spring at this time instant. The first spring, the valve core and the second spring are located in the main valve body, and a direction of the force of the first spring acting on the valve core is opposite to a direction of the force of the second spring acting on the valve core. The valve assembly is further provided with a first valve port and a second valve port. The first valve port is opened or closed by actions of the valve core or opening degree of the first valve port is adjusted by actions of the valve core. Two ends of the main valve body are respectively provided with a first opening and a second opening, the main valve body includes an accommodating cavity which is located between the first opening and the second opening, and a first notch is arranged on a side wall of the main valve body corresponding to the accommodating cavity.

When the first valve port is closed and the second valve port is open, the first notch can communicate with the first opening via the second valve port.

When the first valve port is open and the second valve port is closed, the first notch can communicate with the second opening via the first valve port.

Figure 1:
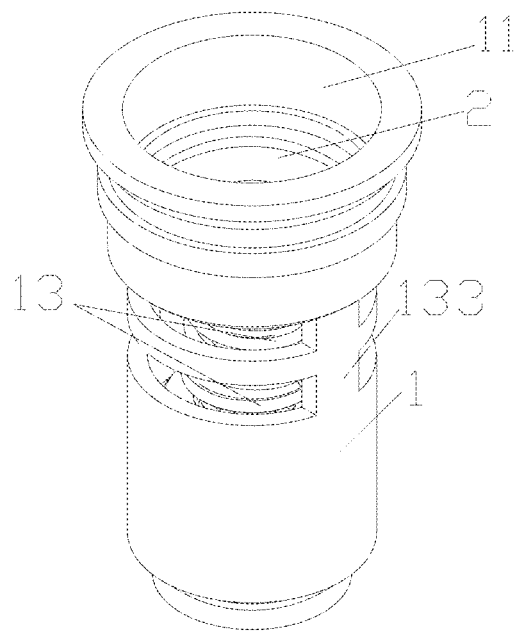
FIG. 1 is a schematic perspective view of an embodiment of a valve assembly according to the present application.

The arrows in the figures indicate a direction of fluid flow.

DETAILED DESCRIPTION OF THE EMBODIMENTS

The technical solutions are specifically illustrated in conjunction with the drawings and embodiments, and the locality terms such as "top", "bottom", "left", "right" mentioned in this specification are set forth according to respective locality relationship in the drawings.

Figure 2:
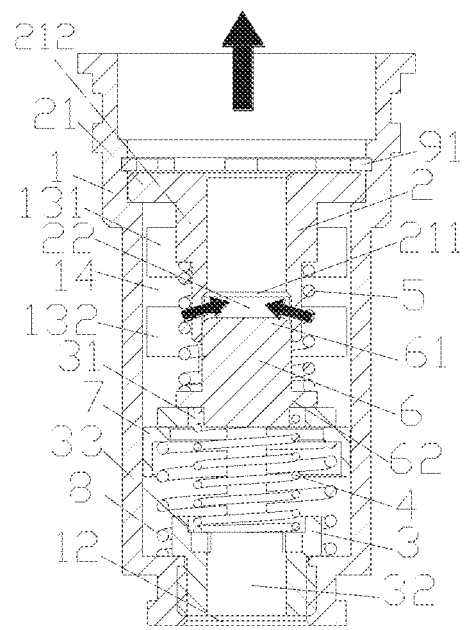
FIG. 2 is a schematic sectional view of the valve assembly shown in FIG. 1, when a first valve port is closed and a second valve port is open.

As shown in FIG. 1 and FIG. 2, a valve assembly includes a hollow main valve body 1 and a valve core 6 mounted in the main valve body 1. Two openings are arranged at two ends of the main valve body 1. An upper valve sleeve 2 and a lower valve sleeve 3 are fixedly mounted at two ends of the interior of the main valve body 1 respectively. A first spring 4 and a second spring 5 are further arranged in the main valve body 1, one end of the first spring 4 abuts against the lower valve sleeve 3, another end of the first spring 4 abuts against one end of the valve core 6, one end of the second spring 5 abuts against another end of the valve core 6, and another end of the second spring 5 abuts against the upper valve sleeve 2. The first spring 4 and the second spring 5 are in a compressed state, such that the valve core 6 is fixed in the main valve body 1. It should be noted that, the second spring 5 is made of a memory alloy material, and has a property that the spring generates elastic performance when the temperature is higher than a specific temperature and the elastic performance fails when the temperature is lower than a specific temperature. In a normal state, the second spring 5 loses the elastic properties and is completely compressed.

Figure 4:
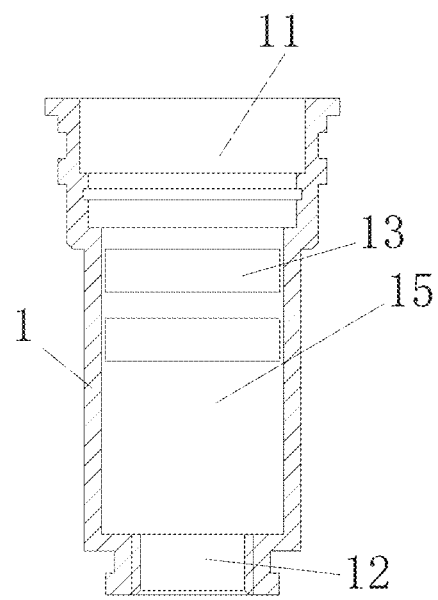
FIG. 4 is a schematic sectional view of a main valve body of the valve assembly shown in FIG. 1.
Figure 5:
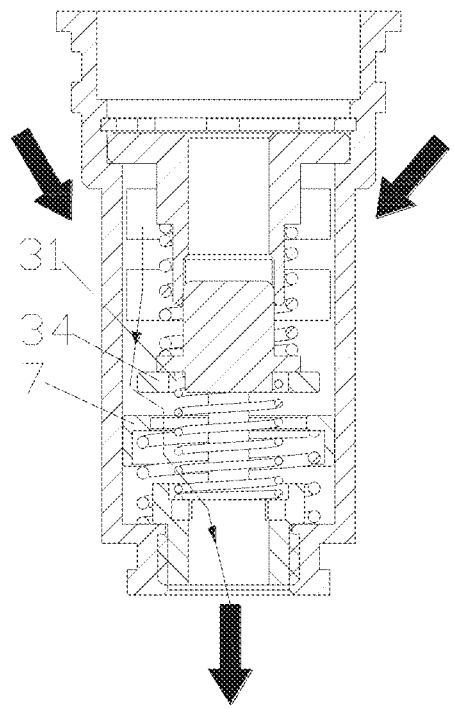
FIG. 5 is a schematic sectional view of the valve assembly shown in FIG. 1 in a pressure relief state.

As shown in FIG. 4, a first opening 11 and a second opening 12 are arranged at two ends of the main valve body 1 respectively, where an inner diameter of the first opening 11 is greater than an inner diameter of the second opening 12, and an inner wall of the second opening 12 is provided with an internal thread. An accommodating cavity 15 is further arranged in the main valve body 1, the accommodating cavity 15 is located between the first opening 11 and the second opening 12, an inner diameter of the accommodating cavity 15 is less than the inner diameter of the first opening 11, a stepped portion is formed between the first opening 11 and the accommodating cavity 15, the inner diameter of the second opening 12 is less than the inner diameter of the accommodating cavity 15, and another stepped portion is formed between the accommodating cavity 15 and the second opening 12.

A first notch 13 is arranged on a side wall of the main valve body 1 corresponding to the accommodating cavity 15, and the first notch 13 is located above the lower valve sleeve 3. Specifically, in the present embodiment, the first notch 13 is close to the stepped portion formed between the first opening 11 and the accommodating cavity 15. In order to make the first notch 13 have a large opening area and make the main valve body 1 relatively stable, the first notch 13 includes a first sub-notch 131 and a second sub-notch 132, and an annular connection portion 14 is arranged between the first sub-notch 131 and the second sub-notch 132, where the annular connection portion 14 may be a portion of the side wall of the main valve body 1. If the annular connection portion 14 is not provided, in a case that the first notch 13 is large, part of the side wall of the main valve body 13 corresponding to the first notch 13 is a connecting column 133, such that the stability of the main valve body 1 is low. While the stability of the main valve body 1 can be well improved by providing the annular connection portion 14.

As shown in FIG. 2, the upper valve sleeve 2 includes a supporting portion 21 having a large outer diameter and a main body portion 212 having a smaller outer diameter than that of the supporting portion 21. A certain distance is kept between an outer wall of the main body portion 212 and an inner wall of the accommodating cavity to form a fluid passage. Part of the second spring 5 is sleeved outside the main body portion, and one end of the second spring 5 abuts against the outer wall of the main body portion. The side wall of the main body portion 212 is further provided with a second valve port 211 and a second notch 22, where the second notch 22 is located below the second valve port 211.

The valve core 6 includes a second end 61 relatively close to the upper valve sleeve 2 and a first end 62 relatively away from the upper valve sleeve 2, where the second end 61 extends into the main body portion 212, and the second valve port 211 is opened or closed by that moving the second end 61 relatively away from the second valve port 211 or abutting the second end 61 against the second valve port 211. When the second valve port 211 is open, the fluid flowing in through the first notch 13 can flow out through the second notch 22 and the second valve port 211.

As shown in FIG. 2, the supporting portion 21 of the upper valve sleeve 2 is in contact with the stepped portion formed between the first opening 11 and the accommodating cavity 15. The upper valve sleeve 2 may be fixed by a first buckle 91, and the supporting portion is in clearance fit with the inner wall of the first opening. It should be noted that the upper valve sleeve 2 may be fixed by other methods (such as riveting and threaded connection). In order to improve the sealing performance, a sealing, ring may further be arranged between the supporting portion 21 and the inner wall of the accommodating cavity 15.

As shown in FIG. 2, part of the lower valve sleeve 3 is located in the accommodating cavity 15, and another part of the lower valve sleeve 3 is located in the second opening 12 and is in threaded connection with the inner wall of the second opening 12.

The lower valve sleeve 3 includes a valve seat portion 34, a spring supporting seat 33, an engagement portion 35 and a through hole 32 penetrating through the lower valve sleeve 3. A first valve port 31 penetrating through the valve seat portion is arranged in the valve seat potion 34, and the first valve port 31 may be part of the through hole 32. The first valve port is relatively away from the first opening with respect to the first notch. The engagement portion 35 is provided with an external thread and can be engaged with the internal thread of the second opening 12 of the main valve body 1, thereby fixedly mounting the lower valve sleeve 3.

In the present embodiment, in order to facilitate the installation of the lower valve sleeve 3, a recess portion 37 recessed in the spring supporting portion 33 is further provided. The concave portion 37 may be of a polygonal structure or multiple recess structures, which is not limited herein.

In the present embodiment, a third notch 36 is further provided between the spring supporting portion 33 and the valve seat portion 34. The third notch 36 partially communicates with the though hole 32 corresponding to the engagement portion 35, that is, the fluid passing through the third notch 36 may flow out of the lower valve sleeve 3 through a lower port of the through hole 32.

As shown in FIG. 2, the engagement portion 35 of the lower valve sleeve 3 is fixed to the inner wall of the second opening 12 of the main valve body 1 by threaded connection. One end of the first spring 4 abuts against the valve core 6, and another end thereof abuts against the spring supporting seat 33.

An outer diameter of the valve seat portion 34 is greater than that of other portions of the lower valve sleeve 3, and the outer diameter of the valve seat portion 34 is smaller than the inner diameter of the accommodating cavity 15. A passage for fluid flowing is formed between the outer wall of the valve seat portion 34 and the corresponding inner wall of the accommodating cavity 15. A pressure relief ring 7 and a third spring 8 are further arranged in the accommodating cavity 15, and a through hole is arranged in the pressure relief ring. The pressure relief ring is sleeved on the lower valve sleeve through the through hole. An inner diameter of the through hole is smaller than an outer diameter of the valve seat portion, such that the pressure relief ring 7 can abut against the valve seat portion 34. The pressure relief ring 7 is in sliding fit with the corresponding inner wall of the accommodating cavity 15. One end of the third spring 8 abuts against the pressure relief ring 7, another end thereof abuts against the stepped portion formed between the accommodating cavity 15 and the second opening 12, and the third spring 8 is in a compressed state. In the normal state, the pressure relief ring 7 abuts against the valve seat portion 34 under the action of the third spring 8, the passage for fluid flowing formed between the outer wall of the valve seat portion 34 and the corresponding inner wall of the accommodating cavity 15 is closed by the pressure relief ring 7, and the passage for fluid flowing formed between the outer wall of the valve seat portion 34 and the corresponding inner wall of the accommodating cavity 15 cannot communicate with the third notch 36. When a force acting on an upper end surface of the pressure relief ring 7 by the fluid is greater than an initial elastic deformation force of the third spring 8, the pressure relief ring 7 moves downward to compress the third spring 8, and when the pressing relief ring 7 moves downward to be intersected with the third notch 36 or below the third notch 36, the passage for fluid flowing formed between the outer wall of the valve seat portion 34 and the corresponding inner wall of the accommodating cavity 15 communicates with the second opening 12 through the third notch 36.

Figure 3:
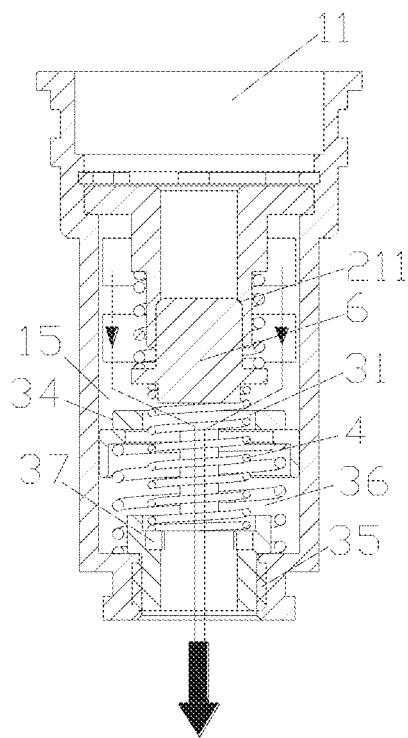
FIG. 3 is a schematic sectional view of the valve assembly shown in FIG. 1, when the second valve port is closed and the first valve port is open.

As shown in FIG. 2 and FIG. 3, the valve core 6 includes the first end 62 and the second end 61. The first end 62 corresponds to the first valve port 31, and the first valve port 31 can be opened or closed by the first end 62. The second end 61 corresponds to the second valve port 211, and the second valve port 211 can be opened or closed by the second end 61. At least part of the second end 61 extends into the main body portion 212, such that the valve core 6 can be positioned, thereby preventing the valve core 6 from shifting, and improving the stability of the valve core 6.

The valve assembly in the present embodiment includes at least two states: a first state, in which the first valve port is open, and the second valve port is closed; and a second state, in which the first valve port is closed, and the second valve port is open. In a case that the temperature of the fluid flowing in from the first notch 13 is low and lower than the temperature at which the second spring 5 generates the elastic properties, the first end 62 of the valve core 6 moves away from the first valve port 31 under the action of the restoring force of the first spring 4, and the second end 61 abuts against the second valve port 211. such a case, the first valve port 31 is open and the second valve port 211 is closed, and the fluid can flow out sequentially through the first valve port 31, the through hole 32 and the second opening 12 after flowing in from the first notch 13. In a case that the temperature of the fluid flowing in from the first notch 13 is higher than the temperature at which the second spring 5 generates the elastic properties, the second spring 5 generates the elastic properties, the elastic force of the second spring 5 is greater than the elastic force of the first spring 4, the valve core 6 moves downward under the action of the elastic force of the second spring 5, and the first end 62 moves downward to compress the first spring 4, until the first valve port 31 is closed. In such a case, the first valve port 31 is closed, the second valve port 211 is open, the fluid can flow out sequentially through the second notch 22, the second valve port 211 and the first opening 11 after flowing in from the first notch 13.

A thermal element is no longer needed to be arranged due to the arrangement of the second spring made of a memory alloy. Thus, the structure of the valve core is simple, the volume of the valve core is small, and a response speed of the second spring made of the memory alloy is faster than that of the thermal element. In a case that the temperature is lower than a specific temperature, the second spring can rapidly lose the elastic properties and be compressed by the first spring, while in a case that the temperature is higher than the specific temperature, the elastic properties of the second spring are rapidly activated, and the second valve port can be closed in time. In addition, even if the temperature of the fluid is much higher than the specific temperature, the second spring will not be damaged due to excessive expansion like the thermal element.

A pressure relief state is further included in the present embodiment. When the first valve port 31 is closed, if other external devices or pipelines are blocked after the fluid flows out of the valve assembly, the fluid cannot flow out of the valve assembly from the first opening 11, such that, when the pressure of the fluid is greater than the initial elastic deformation force of the third spring, the pressure relief ring 7 moves downward and compresses the third spring 8. When the pressure relief ring 7 moves downward to be intersected with the third notch 36 or below the third notch 36, the fluid then flows out sequentially through the passage for fluid flowing formed between the outer wall of the valve seat portion 34 and the corresponding inner wall of the accommodating cavity 15, the third notch 36 and the through hole 32 and the second opening 12.

It should be noted that, in a case that the pressure relief function is not needed, the lower valve sleeve 3 may be integrated with the main valve body 1, that is, the valve seat portion 34 and the spring supporting seat 33 in the lower valve sleeve 3 are part of the main valve body 1, for example, an end portion of the second opening 12 corresponding to the stepped portion between the second opening 12 and the accommodating cavity 15 may serve as the first valve port, and the spring supporting seat 33 may he arranged in the second opening 12.

Figure 6:
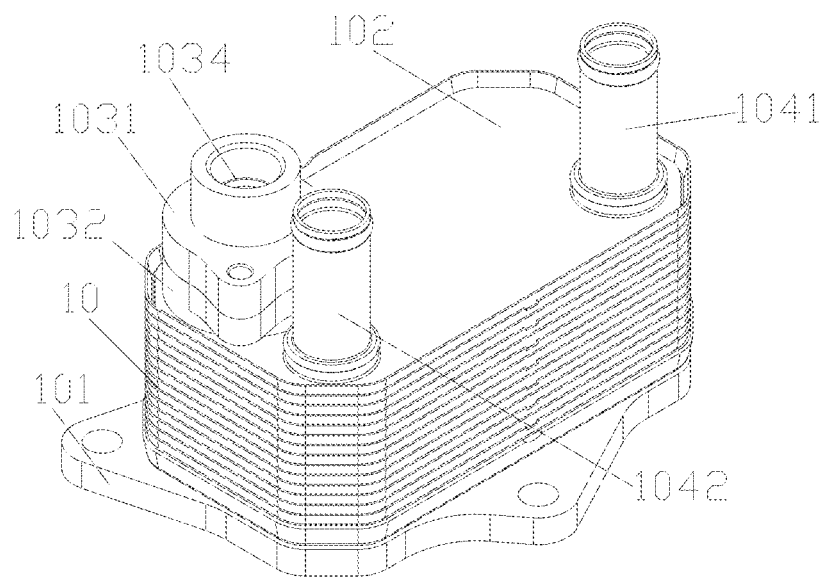
FIG. 6 is a schematic perspective view of an embodiment of a heat exchange assembly mounted with the valve assembly according to the present application.
Figure 7:
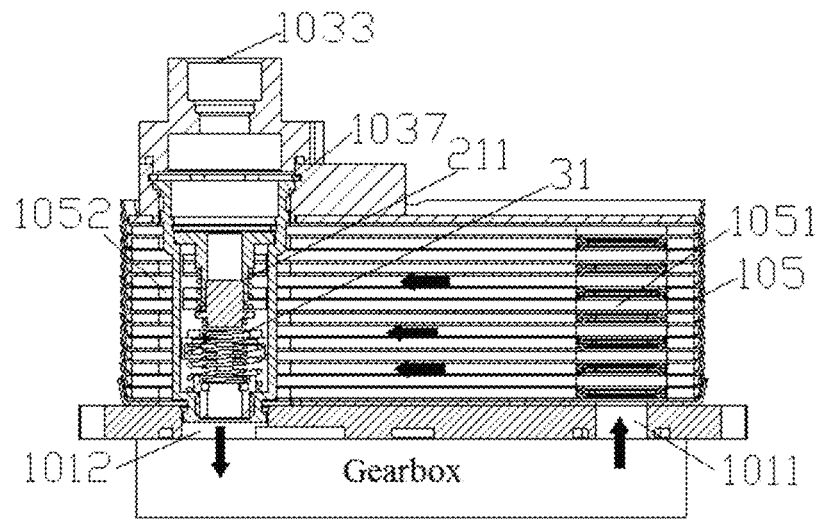
FIG. 7 is a schematic view of the operation of an oil temperature regulation system for a gearbox having the heat exchange assembly shown in FIG. 6 when the cooling oil is at a low temperature.
Figure 8:
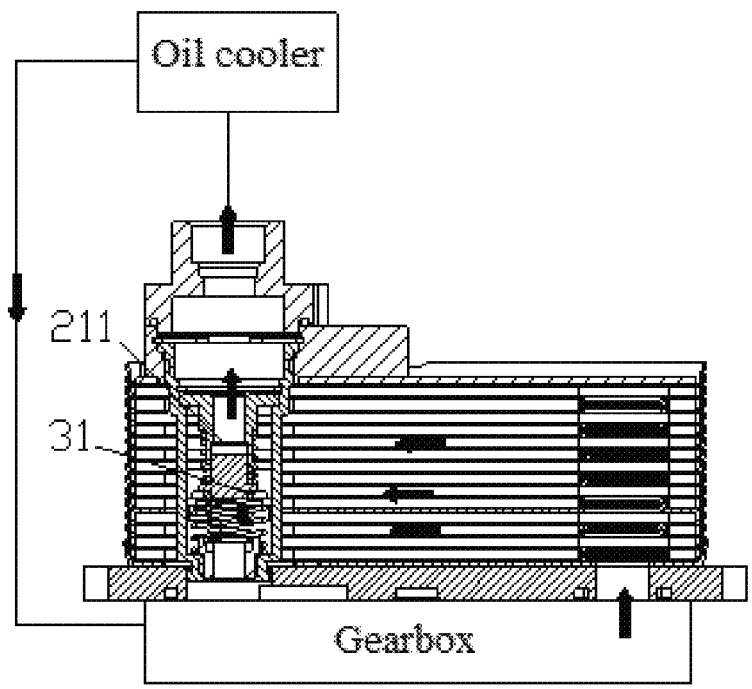
FIG. 8 is a schematic view of the operation of the oil temperature regulation system for a gearbox having the heat exchange assembly shown in FIG. 6 when the cooling oil is at a high temperature.

FIGS. 6 to 8 show a heat exchange assembly mounted with the above valve assembly. As shown in the figures, the heat exchange assembly includes a heat exchange core body 10, a mounting plate 101 fixed to the heat exchange core body, an adapter seat, a first port 1041, a second port 1042, a third port 1011 and a fourth port 1012. The heat exchange core body 10 includes an end plate 102, and a first flow passage and a second flow passage which are isolated from each other. The fluid flowing in the first flow passage and the fluid flowing in the second flow passage exchange heat with each other. The first flow passage is in communication with the first port 1041 and the second port 1042, and the second flow passage is in communication with the third port 1011 and the fourth port 1012.

The first port 1041 and the second port 1042 are in communication with external systems through connecting pipes. The third port 1011 and the fourth port 1012 are formed on the mounting plate 101, the third port 1011 and the fourth port 1012 penetrate through the mounting plate 101, such that the mounting plate can be directly fixed to the gearbox, which is easy to install and has a low risk of external leakage. In order to further improve the sealing performance and prevent the risk of external leakage, a sealing ring and a sealing ring are respectively arranged on outer peripheries of the third port 1011 and the fourth port 1012 of the mounting plate 101.

The second flow passage includes a first passage 1051 and a second passage 1052. One end of the first passage 1051 is in communication with the third port 1011, another end of the first passage 1051 is blocked by the end plate 12. One end of the second passage 1052 is in communication with the fourth port 1012, and another end of the second passage 1052 is in communication with the adapter seat.

The adapter seat includes a first adapter seat 1031 and a second adapter seat 1032. The first adapter seat 1031 includes an accommodating cavity 1034 and a fifth port 1033 in communication with the accommodating cavity 1034. The second adapter seat 1032 includes a seat body 1036, a cavity penetrating through the seat body 1036 is formed in the seat body 1036, and a step 1035 is formed on an inner wall of the seat body 1036 corresponding to the cavity penetrating through the seat body 1036.

The second adapter seat 1032 is fixed to the end plate 102, by means of welding, threaded connection or the like. Moreover, the cavity 1036 penetrating through the seat body corresponds to the second passage 1052. The first adapter seat 1031 is fixed to the second adapter seat 1032 by means of threaded connection or the like, the cavity penetrating through the seat body 1036 corresponds to the accommodating cavity 1034, and the fifth port 1033 can be in communication with at least part of the cavity penetrating through the seat body 1036 via the accommodating cavity 1034. The first adapter seat is fixedly connected to the second adapter seat by screws, and in order to improve the sealing performance, a sealing ring may be further arranged between sealing surfaces of the first adapter seat 1031 and the second adapter seat 1032.

The valve assembly is provided in the second passage 1052, and at least part of the valve assembly is located in the second passage 1052. In the present embodiment, at least part of the valve assembly is located in the adapter seat. The valve assembly is fixed by arranging a snap ring 1037 at the second adapter seat 1032, thereby limiting axial displacement of the valve assembly.

FIG. 7 and FIG. 8 show an oil temperature regulation system for a gearbox having the above heat exchange assembly. The oil temperature regulation system for the gearbox includes a gearbox, a heat exchange assembly, an oil cooler and an engine water tank (not shown in the figures), where the first port and the second port of the heat exchange assembly are in communication with the engine water tank through pipelines, and the third port and the fourth port directly communicate with an inlet and an outlet of the gearbox or communicate with the inlet and the outlet of the gearbox through pipelines. One flow passage of the oil cooler is in communication with the fifth port of the heat exchange assembly and the inlet of the gearbox through pipelines, and another flow passage of the oil cooler may be in communication with a refrigeration system (not shown in the figures).

When a temperature of the cooling oil is in a normal state after the cooling oil flowing out from the outlet of the gearbox performs heat exchange within the heat exchange core body, the cooling oil enters the valve assembly via the first notch, and due to the restoring force of the first spring, the first valve port 31 is in an open state, and the second valve port 211 is in a closed state, and the cooling oil can flow back to the gearbox via the fourth port and the inlet of the gearbox after passing through the first valve port 31, completing one cycle.

When the temperature of the cooling oil is higher than a normal temperature after the cooling oil flowing out from the outlet of the gearbox performs heat exchange within the heat exchange core body, the valve core is thermally expanded and moves downward to close the first valve port 31, and at this time, the first valve port 31 is in the closed state, the second valve port 211 is in the open state, the cooling oil flows to the oil cooler via the fifth port, and the cooling oil can flow to the oil cooler via the fifth port after flowing through the second valve port 211. The high temperature cooling oil is cooled to a normal temperature stale through the heat exchange within the oil cooler, and then flows back to the gearbox through the inlet of the gearbox, completing one cycle.

Further, in a case that the temperature of the cooling oil is high, and the oil cooler is blocked, although the first valve port 31 is in the closed state, the high-temperature cooling oil can utilize the pressure relief function of the valve assembly to enable the cooling oil to flow back to the gearbox through the passage for fluid flowing formed between the outer wall of the valve seat portion 34 and the corresponding inner wall of the accommodating cavity 15, the fourth port and the inlet of the gearbox, thereby preventing the gearbox from being damaged due to oil shortage.

The above description is merely specific embodiments of the present application, and is not intended to limit the present application in any form. The locality terms such as "top", "bottom", "left", and "right" appearing in the specification are all described with reference to the accompanying drawings and are not intended to limit the orientation thereof. Although the present application is disclosed by preferred embodiments above, the preferred embodiments are not used to limit the present application. Possible modifications and improvements can be made to the technical solution of the present application by those skilled in the art based on the above disclosed technical contents without departing from the scope of the technical solutions of the present application. Any simple changes and equivalent modifications made based on the technical essence of the present application without departing from the content of the technical solutions of the present application should fall within the protection scope of the technical solutions of the present application.

The invention claimed is:

1. A heat exchange assembly, comprising a heat exchange core body and a mounting plate which is fixed to the heat exchange core body, the heat exchange assembly further comprising a first port, a second port, a third port and a fourth port, the heat exchange core body comprising an end plate, and the heat exchange core body further comprising a first flow passage and a second flow passage which are isolated from each other; the first flow passage being in communication with the first port and the second port, the second flow passage being in communication with the third port and the fourth port, and the second flow passage comprising a first passage and a second passage; wherein the heat exchange assembly further comprises a valve assembly and an adapter seat, the adapter seat is provided with a cavity corresponding to the second passage and a fifth port in communication with the cavity, and the valve assembly is arranged in or partially arranged in the second passage;

the valve assembly comprises a main valve body and a valve core arranged in the main valve body, one end of the main valve body is sealingly mounted with the adapter seat, and another end of the main valve body is sealingly mounted with an inner wall of the fourth port or the second passage; a side wall of the main valve body is provided with a first notch, a first valve port and a second valve port are arranged in the main valve body, and a first spring and a second spring are further arranged in the main valve body, the second spring is made of a memory alloy, an elastic force of the second spring, when the second spring gains elastic performance, is greater than an elastic force of the first spring at this time instant, and a direction of the force of the first spring acting on the valve core is opposite to a direction of the force of the second spring acting on the valve core;

the third port is in communication with the fourth port via the first passage, the second passage, the first notch and the first valve port when the first valve port is open and the second valve port is closed; and the third port is in communication with the fifth port via the first passage, the second passage, the first notch and the second valve port when the first valve port is closed and the second valve port is open, wherein part of the second spring is sleeved outside the main body portion, a side wall of the main body portion is further provided with a second notch, the second notch is located below the second valve port, and when the first valve port is closed and the second valve port is open, one end of the second spring abuts against an outer wall of the main body portion, another end of the second spring abuts against the valve core, and the second notch is in communication with the second valve port.

2. The heat exchange assembly according to claim 1, wherein two ends of the main valve body are respectively provided with a first opening and a second opening, the main valve body comprises an accommodating cavity located between the first opening and the second opening; a first notch is arranged on a side wall of the main valve body corresponding to the accommodating cavity, the valve assembly is provided with an upper valve sleeve at the first opening or at a position relatively toward the first opening, one end of the valve core is extended into the upper valve sleeve and is capable of being supported by the upper valve sleeve, the upper valve sleeve comprises a supporting portion and a main body portion, and the second valve port is arranged in the main body portion.

3. The heat exchange assembly according to claim 2, wherein the adapter seat comprises a first adapter seat and a second adapter seat, the first adapter seat comprises the fifth port, the second adapter seat is further provided with a snap ring, the valve assembly is fixed by the snap ring, and axial displacement of the valve assembly is limited by the snap ring.

4. The heat exchange assembly according to claim 3, wherein the valve assembly further comprises a lower valve sleeve, part of the lower valve sleeve is located in the accommodating cavity, another part of the lower valve sleeve is located in the second opening and is sealingly fixed to an inner wall of the second opening, the lower valve sleeve comprises a valve seat portion, a spring supporting seat, an engagement portion and a through hole penetrating through the lower valve sleeve, the first valve port is located at the valve seat portion, the engagement portion is sealingly fixed to the inner wall of the second opening, and when the first valve port is closed, the first notch is not in communication with the second opening.

5. The heat exchange assembly according to claim 4, wherein the first valve port is part of the through hole, a third notch is arranged between the spring supporting portion and the valve seat portion, the third notch is in communication with the through hole, the third notch is in communication with the second opening through the through hole, an outer diameter of the valve seat portion is greater than an outer diameter of other portions of the lower valve sleeve, the outer diameter of the valve seat portion is smaller than an inner diameter of the accommodating cavity, a passage for fluid flowing is formed between an outer wall of the valve seat portion and the accommodating cavity, a pressure relief ring and a third spring are further provided in the accommodating cavity, the pressure relief ring is provided with a through hole, the pressure relief ring is sleeved on the lower valve sleeve through the through hole, an inner diameter of the through hole is smaller than the outer diameter of the valve seat portion, the pressure relief ring is in sliding fit with a corresponding inner wall of the accommodating cavity, one end of the third spring abuts against the pressure relief ring, another end of the third spring abuts against an inner wall of the main valve body, and the pressure relief ring is capable of abutting against the valve seat portion through the third spring; and the passage is in communication with the third notch, if the pressure relief ring abuts against the valve seat portion; and the passage is not in communication with the third notch, if the pressure relief ring is away from the valve seat portion.

6. An oil temperature regulation system for a gearbox, comprising a gearbox, a heat exchange assembly and an oil cooler, wherein the heat exchange assembly comprises a heat exchange core body and a mounting plate which is fixed to the heat exchange core body, the heat exchange assembly further comprises a first port, a second port, a third port and a fourth port, the heat exchange core body comprises an end plate, and the heat exchange core body further comprises a first flow passage and a second flow passage which are isolated from each other; the first flow passage is in communication with the first port and the second port, the second flow passage is in communication with the third port and the fourth port, and the second flow passage comprises a first passage and a second passage; the heat exchange assembly further comprises a valve assembly and an adapter seat, the adapter seat is provided with a cavity corresponding to the second passage and a fifth port in communication with the cavity, and the valve assembly is arranged in or partially arranged in the second passage;

the valve assembly comprises a main valve body and a valve core arranged in the main valve body, one end of the main valve body is sealingly mounted with the adapter seat, and another end of the main valve body is sealingly mounted with an inner wall of the fourth port or the second passage; a side wall of the main valve body is provided with a first notch, a first valve port and a second valve port are arranged in the main valve body, and a first spring and a second spring are further arranged in the main valve body, the second spring is made of a memory alloy, an elastic force of the second spring, when the second spring gains elastic performance, is greater than an elastic force of the first spring at this time instant, and a direction of the force of the first spring acting on the valve core is opposite to a direction of the force of the second spring acting on the valve core;

the third port is in communication with the fourth port via the first passage, the second passage, the first notch and the first valve port when the first valve port is open and the second valve port is closed;

the third port is in communication with the fifth port via the first passage, the second passage, the first notch and the second valve port when the first valve port is closed and the second valve port is open;

the third port and the fourth port are in direct communication with an inlet and an outlet of the gearbox, or the third port and the fourth port are in communication with the inlet and the outlet of the gearbox via pipelines; an outlet of one flow passage of the oil cooler is in communication with the heat exchange assembly through the pipelines, and an inlet of the flow passage of the oil cooler is in communication with the fifth port;

when a temperature of a cooling oil is in a normal state after the cooling oil flowing out from the outlet of the gearbox enters the heat exchange core body and performs heat exchange, the cooling oil enters the valve assembly via the first notch, and due to failure of elastic properties of the second spring, the valve core allows the first valve port to be in an open state under a restoring force of the first spring, the second valve port is closed, and the cooling oil flows back to the gearbox via the fourth port and the inlet of the gearbox after passing through the first valve port; and when the temperature of the cooling oil is relatively high after the cooling oil flowing out from the outlet of the gearbox performs heat exchange within the heat exchange core body, the cooling oil enters the valve assembly via the first notch, the elastic properties of the second spring are activated at this time instant, the valve core closes the first valve port, the first valve port is in a closed state, the second valve port is opened, the cooling oil flows to the oil cooler via the fifth port, and the cooling oil flowing out of the oil cooler flows back to the gearbox via the inlet of the gearbox after passing through a through passage and the fifth port, wherein part of the second spring is sleeved outside the main body portion, a side wall of the main body portion is further provided with a second notch, the second notch is located below the second valve port, and when the first valve port is closed and the second valve port is open, one end of the second spring abuts against an outer wall of the main body portion, another end of the second spring abuts against the valve core, and the second notch is in communication with the second valve port.

7. The oil temperature regulation system for a gearbox assembly according to claim 6, wherein two ends of the main valve body are respectively provided with a first opening and a second opening, the main valve body comprises an accommodating cavity located between the first opening and the second opening; a first notch is arranged on a side wall of the main valve body corresponding to the accommodating cavity, the valve assembly is provided with an upper valve sleeve at the first opening or at a position relatively toward the first opening, one end of the valve core is extended into the upper valve sleeve and is capable of being supported by the upper valve sleeve, the upper valve sleeve comprises a supporting portion and a main body portion, and the second valve port is arranged in the main body portion.

8. The oil temperature regulation system for a gearbox assembly according to claim 7, wherein the adapter seat comprises a first adapter seat and a second adapter seat, the first adapter seat comprises the fifth port, the second adapter seat is further provided with a snap ring, the valve assembly is fixed by the snap ring, and axial displacement of the valve assembly is limited by the snap ring.

9. The oil temperature regulation system for a gearbox assembly according to claim 8, wherein the valve assembly further comprises a lower valve sleeve, part of the lower valve sleeve is located in the accommodating cavity, another part of the lower valve sleeve is located in the second opening and is sealingly fixed to an inner wall of the second opening, the lower valve sleeve comprises a valve seat portion, a spring supporting seat, an engagement portion and a through hole penetrating through the lower valve sleeve, the first valve port is located at the valve seat portion, the engagement portion is sealingly fixed to the inner wall of the second opening, and when the first valve port is closed, the first notch is not in communication with the second opening.

10. The oil temperature regulation system for a gearbox assembly according to claim 9, wherein the first valve port is part of the through hole, a third notch is arranged between the spring supporting portion and the valve seat portion, the third notch is in communication with the through hole, the third notch is in communication with the second opening through the through hole, an outer diameter of the valve seat portion is greater than an outer diameter of other portions of the lower valve sleeve, the outer diameter of the valve seat portion is smaller than an inner diameter of the accommodating cavity, a passage for fluid flowing is formed between an outer wall of the valve seat portion and the accommodating cavity, a pressure relief ring and a third spring are further provided in the accommodating cavity, the pressure relief ring is provided with a through hole, the pressure relief ring is sleeved on the lower valve sleeve through the through hole, an inner diameter of the through hole is smaller than the outer diameter of the valve seat portion, the pressure relief ring is in sliding fit with a corresponding inner wall of the accommodating cavity, one end of the third spring abuts against the pressure relief ring, another end of the third spring abuts against an inner wall of the main valve body, and the pressure relief ring is capable of abutting against the valve seat portion through the third spring; and the passage is in communication with the third notch, if the pressure relief ring abuts against the valve seat portion; and the passage is not in communication with the third notch, if the pressure relief ring is away from the valve seat portion.

\* \* \* \* \*